W. HAY.
Scale Measure.

No. 65,744.

Patented June 11, 1867.

Witnesses:

Inventor:
W. Hay

United States Patent Office.

WILLIAM HAY, OF DUMBARTON, SCOTLAND, ASSIGNOR TO ROBERT HAY, OF MINERAL POINT, WISCONSIN.

Letters Patent No. 65,744, dated June 11, 1867.

IMPROVEMENT IN SCALE-RULES.

The Schedule referred to in these Letters Patent and making part of the same.

TO ALL WHOM IT MAY CONCERN:

Be it known that I, WILLIAM HAY, of Dumbarton, in the county of Dumbarton, in that part of the United Kingdom of Great Britain and Ireland known as Scotland, have invented a new and improved Scale-Rule; and I do hereby declare that the following is a full, clear, and exact description of the same, reference being had to the accompanying drawings, making a part of this specification, in which—

Similar letters of reference indicate corresponding parts in all the figures.

This invention consists in the construction of a rule for the use of mechanics, with scales, whereby the rule may be employed not only for measuring surfaces in the ordinary way, but also for ascertaining the circumference of a circle of any given radius; also, for finding the side of a square equal to the area of a given circle; also, for finding the radius of a circle equal in area to a given square; also, for dividing a circle into any desired number of equal parts; and, furthermore, for finding the side of the greatest square that can be inscribed within a given circle; and also the circle that will circumscribe a given square, thus rendering the rule capable of much more universal employment in different kinds of work than those heretofore in use.

To enable others to understand the nature and construction of my invention, I will proceed to describe it, with reference to the drawings.

Figure 1:
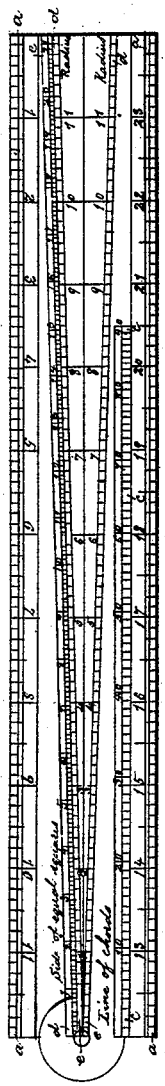
Figure 1 represents that side of the rule which I denominate the side of equal squares, the rule being in a closed or folded condition.
Figure 2:
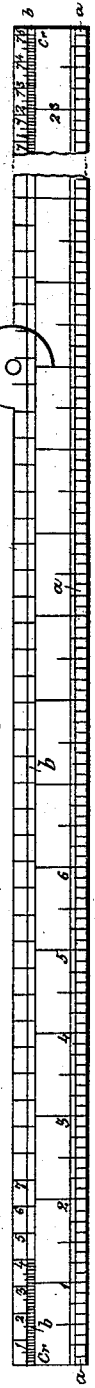
Figure 2 represents the opposite side of the rule, the rule being extended or opened out.
Figure 3:
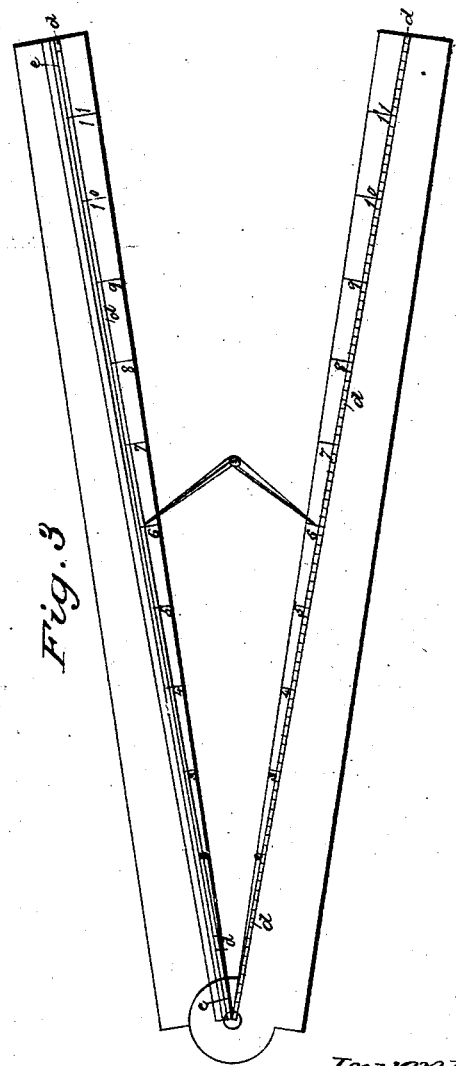
Figure 3 shows the side of equal squares, and the position of the rule when used for dividing a circle into equal parts or segments.

The several figures represent a jointed two-foot rule, on the outer edge of each side of which is a scale, $a\,a$, marked in inches, and subdivided by eighths of an inch, in the same manner as a rule of ordinary construction. Marked upon that side of the rule shown in fig. 2, and at the inner edge thereof, or, in other words, at the edge opposite the scale $a\,a$ of the said side, is another scale, $b\,b$. Of the divisions of this scale $b\,b$ there are 3.14159 to the inch, so that the number of divisions in the scale $b\,b$ are in the same proportion to the number of those of the scale $a\,a$ as the circumference of a circle is to the diameter thereof, in order that the diameter of a circle being measured by the scale $a\,a$, the circumference thereof will be indicated by the scale $b\,b$ at a point exactly opposite that point on the scale $a\,a$ which indicates the diameter of the circle; thus, for instance, if the diameter is shown at $a'$ on the scale $a\,a$, the circumference will be shown at $b'$ on the scale $b\,b$. The divisions of the scale $b\,b$ are numbered consecutively from one upward, and are subdivided each into eight, or any other desired or suitable number of equal parts, as shown in the aforesaid fig. 2. The opposite side or surface of the rule is represented in figs. 1 and 3, and on one leg of the rule. Upon the said side thereof is another scale, $c\,c$, which is situated just within the scale $a\,a$ of the said side, on what I denominate the line of chords. The chord-scale $c\,c$ is divided into ninety parts or degrees, which are so graduated as to diminish in length from one upward, in the same proportion that the sides of a square diminish when inscribed within circles having a less radius and which are indicated by figures or numbers, placed at suitable intervals along the said scale. As shown in the drawings, the length of this scale $c\,c$ is equal to the side of the largest square that can be inscribed within a circle having a radius of six inches. Formed upon the same side of the rule, one upon each of the legs thereof, are two radius-scales $d\,d$, which are identical in construction. Each scale $d\,d$ extends from the centre $c'$ of the joint or hinge of the rule to the outer end of the arm on which it is formed, and is situated at a slight angle to the edge thereof, in such manner that when the rule is folded or closed, as shown in the said fig. 1, the said scales will be placed at an angle or inclination with reference to each other, both radiating from the common centre $c'$. These radius-scales are each divided into twelve equal parts, which are indicated by suitable numerals, the said divisions being further subdivided into eighths, in the same manner as the scale $a\,a$. Inasmuch as the radius-scales $d\,d$ extend the whole length of the legs of the rule upon which they are formed, the centre of each of the said scales is at the point indicated by the fig. 6, the division lines in one scale being exactly opposite those on the other.

When it is desired to divide a circle into a given number of equal parts, the number 360 (being the number of degrees of the circle) is divided by the number of the parts desired. One leg of a pair of dividers is then placed upon the end of the chord-scale $c\,c$, and the other leg thereof is placed upon that point of the said chord-scale indicated by the numeral corresponding with the quotient resulting from the division of 360, as just mentioned. The two legs of the rule are then spread apart, and the dividers are removed from the chord-scale $c\,c$, and placed with each of their legs upon the centre 6 of one of the radius-scales, $d\,d$, as represented in fig. 3. The distance apart of the two legs of the rule, and consequently the angle at which they stand with reference to each other being thus determined; the opposite sides of any one of the parts into which it is desired to divide the circle will be described by the inner edges of the two legs of the rule, so that, by placing the centre $c'$ of the joint of the rule exactly upon the centre of the circle, the said circle may be divided into the desired number of parts or segments by successively marking each part at the inner edges of the two legs of the rule, as just mentioned. Formed upon one leg of the scale, on the side of equal square, parallel with one of the radius-scales, $d\,d$, and at the outer side thereof, is another scale, $e\,e$, the length of the divisions of which are proportioned to that of the divisions of the radius-scales $d\,d$ in the same ratio that the side of a square is proportioned to the radius of a circle of the same area, so that the radius of any circle being shown on the scale $d\,d$, the side of a square of the same area as such circle is shown at a corresponding point on the scale $e\,e$. Thus, if the radius of a circle is seven inches, as shown in the radius-scale $d\,d$, the side of a square of the same area will be shown at 12.4 on the scale $e\,e$, the divisions of the scale being numbered consecutively from one upward, and subdivided into tenths. When it is desired to find the radius of a circle having the same area as a given square, the side of such square, as shown on the scale $e\,e$, is first found, when, of course, the radius of the desired circle is found indicated at a corresponding point upon the radius-scale $d\,d$. Inasmuch as the length of the chord-scale $c\,c$ is equal to the side of the greatest square that can be inscribed within a circle having a radius of six inches, it follows that the side of the largest square that can be inscribed within a circle of less radius than six inches will be indicated at proportionate points upon the said chord-scale. Thus the side of the greatest square that can be drawn within a circle having a radius of five inches will be indicated by the seventy-fifth degree upon the said chord-scale. By reversing the operation, the circle that will circumscribe a given square may be found. Thus, if the side of such square is indicated by the seventy-fifth degree on the chord-scale $c\,c$, the radius of the circle that will circumscribe the square will be shown at 5 on the radius-scale; or, if the side of such square is indicated by the forty-fifth degree on the chord-scale, the said radius will be shown at 3 on the said radius scale.

What I claim as new, and desire to secure by Letters Patent, is—

1. Providing a rule with a fixed scale, $b\,b$, indicating the circumference of circles, arranged in relation with the ordinary measuring scale $a\,a$, substantially as herein set forth, for the purpose specified.

2. Providing a rule, with a chord-scale, $c\,c$, arranged in combination with the radius-scale $d\,d$, substantially as herein set forth, for the purpose specified.

3. Providing a rule with the scale $e\,e$, arranged in relation with the radius-scales $d\,d$, substantially as herein set forth, for the purpose specified.

4. The construction of a rule with the scales $b\,b$, $c\,c$, $d\,d$, and $e\,e$, arranged in relation with each other and with the scale of inches or other measurement, substantially as herein set forth, for the purpose specified.

WILLIAM HAY.

Witnesses:
JOHN DICKSON,
JOHN HAYTHORN.